2,848,517
SEPARATION OF XYLENE ISOMERS

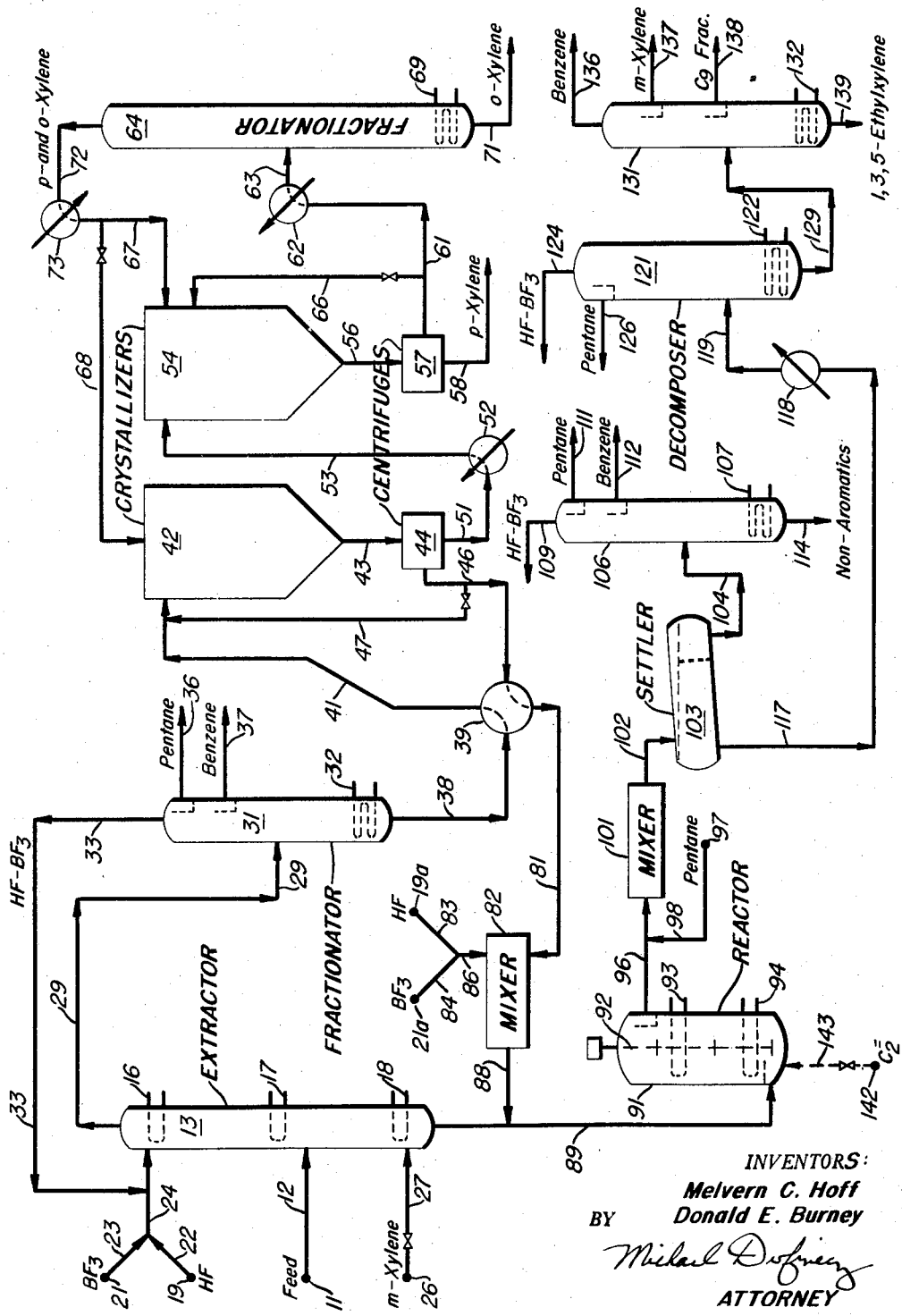

Melvern C. Hoff, Highland, and Donald E. Burney, Griffith, Ind., assignors to Standard Oil Company, Chicago, Ill., a corporation of Indiana Application July 23, 1954, Serial No. 445,236

4 Claims. (Cl. 260—674)

This invention relates to the separation of a mixture of $C_8$ aromatic hydrocarbons into the individual xylene isomers and 1,3-dimethyl-5-ethylbenzene. More particularly the invention relates to the treatment of a xylene boiling range petroleum distillate to recover essentially pure o-xylene, m-xylene, p-xylene and also 1,3-dimethyl-5-ethylbenezene.

Presently there exists a very large demand for high purity o-xylene for the production of phthalic anhydride; high purity p-xylene for the production of synthetic resins and ethylbenzene derivatives for the preparation of styrene type polymers. In addition to ethylbenzene itself, 1,3-dimethyl-5-ethylbenzene, i. e., 1,3,5-ethylxylene, is of considerable interest as a source of a styrene type resin having a softening point above the boiling point of water. Presently m-xylene is of interest primarily as a solvent.

Distillates are obtained from the catalytic reforming, in the presence of hydrogen, of petroleum naphthas, which distillates contain very large amounts of the $C_8$ aromatic hydrocarbons in about the thermodynamic equilibrium distribution. By extractive distillation, it is possible to obtain a distillate containing between about 88–95% of $C_8$ aromatic hydrocarbons and the remainder non-aromatic hydrocarbons boiling closely about the boiling range of $C_8$ isomers; a very slight amount of $C_9$ aromatic hydrocarbons is normally present in this fraction. Today it is possible to produce a $C_8$ aromatic hydrocarbon fraction from petroleum sources, which fraction contains essentially no non-aromatic hydrocarbon constituents.

It is an extremely complex problem to separate a natural mixture of $C_8$ aromatic hydrocarbons into their individual constituents. Usually the xylene fraction is super-fractionated to produce a bottoms product containing about 80% of o-xylene. The overhead which contains m-xylene, p-xylene, ethylbenzene and some o-xylene is then subjected to crystallization in order to separate out high purity p-xylene. Unfortunately, this technique results in the production of a fraction containing substantially all the m-xylene and the ethylbenzene. This m-xylene, ethylbenzene fraction is separable by selectively alkylating the m-xylene. The problem of recovery of the o-xylene by fractionation and the p-xylene by crystallization is considerably simplified after m-xylene is removed from the xylene feed as a first step.

An object of the invention is the separation of a $C_8$ aromatic hydrocarbon mixture into the various xylene isomers. Another object of the invention is the separation of a $C_8$ aromatic hydrocarbon mixture under conditions to maximize the recovery of essentially pure o-xylene and p-xylene. Still another object is a process for the separation of a mixture containing all the xylene isomers and ethylbenzene into essentially pure o-xylene and p-xylene; high purity m-xylene and 1,3-dimethyl-5-ethylbenzene under conditions wherein degradation of o-xylene and p-xylene is minimized.

The process of this invention comprises: a feed, containing as essentially the only aromatic hydrocarbon constituents a mixture of all the xylene isomers and ethylbenzene, and essentially no hydrocarbons reactive with the xylene or ethylbenzene, is contacted with HF—$BF_3$ treating agent under conditions of temperature, time, and $BF_3$ usage such that the m-xylene and part of the ethylbenzene (as diethylbenzene and ethylxylene) is extracted into the HF—$BF_3$ acid phase; the raffinate phase contains substantially all the o-xylene and p-xylene, unconverted ethylbenzene and a portion of the non-aromatic hydrocarbons present in the feed. The raffinate phase is freed of HF and $BF_3$ and is then chilled in a crystalizer to a temperature sufficiently low to produce a mixture of crystals of o-xylene and p-xylene. A portion of the mother liquor along with additional HF and $BF_3$ is joined with the HF—$BF_3$ acid phase; the conditions of time and temperature are so controlled that essentially all the ethylbenzene and diethylbenzene interact with xylene to produce 1,3-dimethyl-5-ethylbenzene as essentially the only interaction product and the o-xylene and p-xylene present are isomerized to m-xylene. The mixture of crystals of o-xylene and p-xylene are recrystallized under conditions to produce essentially pure p-xylene crystals and a mother liquor having about the composition of the eutectic mixture of p-xylene and o-xylene. This second mother liquor is then fractionated by distillation to produce as a bottoms cut essentially pure o-xylene.

The invention is described in conjunction with the drawing, which drawing forms a part of this specification. It is to be understood that the drawing is schematic in nature and that many items of process equipment have been omitted as these may be readily added by one skilled in the art.

Feed from source 11 is passed by way of line 12 into extractor 13. The feed to the process may be a mixture of o-xylene, p-xylene, m-xylene and ethylbenzene—either a natural mixture or one made up by fractions from various conversion processes. The xylene mixture may be essentially pure with respect to non-aromatic constituents or it may contain non-aromatic hydrocarbons such as paraffins and cycloparaffins which boil close to the boiling range of the $C_8$ aromatic hydrocarbons themselves. If the xylene feed contains no close boiling non-aromatic hydrocarbons, it is desirable to dilute the xylene feed with a low boiling hydrocarbon which is readily separable from the xylenes by distillation. Examples of suitable hydrocarbons are pentane, hexane; or a higher boiling hydrocarbon may be used as a diluent, although this is not preferred because of the increased difficulty of separation by fractional distillation. When using a diluent hydrocarbon it is preferred that the total feed consist of about 50 volume percent $C_8$ aromatic hydrocarbons and the remainder non-aromatic hydrocarbons. In this illustration, the feed consists of a xylene boiling range petroleum distillate derived by fractionation of a hydroformate. The xylene range material contains, on a volume percent basis, o-xylene, 20%, m-xylene, 35%, p-xylene, 15%, ethylbenzene, 25% and paraffins, 5%. The feed has been diluted with pentane to have a total paraffinic content of about 50 volume percent.

Extractor 13 is a conventional countercurrent contacting tower which may be provided with any of the various conventional methods for obtaining efficient contacting between two immiscible liquids. Extractor 13 may be operated at constant temperature from top to bottom or by the use of heat exchanger means 16, 17, and 18; the temperature may be varied over the height of the tower. Substantially constant temperature is maintained throughout the tower at +25° C. The temperature and time of contacting between the $C_8$ aromatic hydrocarbons and the HF—$BF_3$ treating agent must be so controlled that essentially no isomerization of the o-xylene and p-xylene takes place. In general, suitable temperature of operation is between about −10° and +30° C. At these temperatures, the time of contacting may be between about 2 minutes and 30 minutes. The shorter the time of contacting, the better, particularly at the higher temperatures. It is preferred to operate at a temperature between about +10° C. and +25° C. and for a time of contacting of not more than about 20 minutes. The time of contacting in this embodiment in extractor 13 is maintained at 10 minutes.

The feed may be introduced at various points along the height of extractor 13. However, in this embodiment, all the feed is introduced at a point just below the vertical mid-point of extractor 13.

At an upper point of extractor 13, liquid HF from source 19 and $BF_3$ from source 21 are passed by way of lines 22 and 23 respectively, into line 24, and therefrom into extractor 13.

The contacting is carried out under substantially anhydrous conditions and the liquid HF contains not more than about 3% of water. In this embodiment, the commercial grade anhydrous liquid HF is used.

Sufficient liquid HF must be used to exceed the solubility thereof in the hydrocarbons and also to participate in the formation of a complex along with $BF_3$ and the xylenes in the feed. In general, between about 5 and about 50 moles of liquid HF are used per mole of m-xylene in extractor 13. More usually the usage of liquid HF is between about 7 and 15 moles. In this embodiment, 11 moles of liquid HF are used per mole of m-xylene in extractor 13.

It is known that $BF_3$ and HF combine with xylene to form complexes having different stabilities. The complex of m-xylene is the most stable. By adjusting the amount of $BF_3$, it is possible to separate m-xylene from o-xylene and p-xylene. The m-xylene appears in the HF—$BF_3$ acid phase and the o-xylene and p-xylene appear as a raffinate phase. By the use of countercurrent contacting in a tower providing about 5 theoretical stages, it is possible to separate a mixture of xylene isomers into an acid phase containing m-xylene and substantially no o-xylene and p-xylene and a raffinate phase containing o-xylene, p-xylene, and m-xylene (dependent on the $BF_3$ usage). In order to accomplish the separation with minimum loss of o-xylene and p-xylene to the acid phase, the $BF_3$ usage is adjusted to about 1 mole per mole of m-xylene present in extractor 13.

The ethylbenzene present is very rapidly disproportionated to diethylbenzene and benzene and also interacts with xylene to form ethylxylene. The diethylbenzene and ethylxylene form stable complexes with HF and $BF_3$ and in order to permit good separation of the xylene isomers, it is necessary to provide additional $BF_3$ for the complexing of the diethylbenzene and ethylxylene formed. Therefore, in addition to the about 1 mole of $BF_3$ per mole of m-xylene present, about 0.5 mole of $BF_3$ are introduced per mole of ethylbenzene present in extractor 13. In this embodiment, the $BF_3$ usage is 1 mole per mole of m-xylene and 0.5 mole per mole of ethylbenzene.

In order to improve the degree of separation, a reflux stream of high purity m-xylene from source 26 is introduced by way of valved line 27 into extractor 13 at a point above the exit for the acid phase. The amount of m-xylene refluxed will vary with the conditions of operation in extractor 13. In this embodiment, about 3 moles of m-xylene are refluxed per mole of m-xylene in the feed.

A raffinate phase comprising benzene, o-xylene, p-xylene, ethylbenzene and non-aromatic hydrocarbons is withdrawn from the top of extractor 13 by way of line 29 and is introduced into fractionator 31. Fractionator 31 is shown schematically and is provided with an internal reboiler 32. The temperature in fractionator 31 is so adjusted that HF and $BF_3$ occluded in the raffinate phase are removed overhead and are recycled to extractor 13 by way of lines 33 and 24. Pentane diluent is withdrawn by way of line 36 and recycled to extractor 13 by lines not shown. Benzene produced by the disproportionation or interaction is withdrawn by way of line 37 and is sent to storage by lines not shown.

A bottoms fraction is produced in fractionator 31 which comprises o-xylene, p-xylene, ethylbenzene, and close boiling non-aromatic hydrocarbons. This fraction is withdrawn by way of line 38 and is passed through heat exchanger 39. In heat exchanger 39 the temperature of the liquid is reduced by interchange with cold mother liquor from a subsequent operation. This stream is further reduced in temperature by conventional cooling means and is passed by way of line 41 into crystallizer 42.

Crystallizer 42 represents schematically a vessel or vessels for separating a mixture of crystals of o-xylene and p-xylene from a mother liquor. Any of the conventional types of crystallizers may be utilized herein. Crystallizer 42 is operated at a temperature sufficiently low to crystallize not only p-xylene, but also some o-xylene in order to produce a mixture of crystals of both p-xylene and o-xylene. In general, the temperature of operation in crystallizer 42 is between about −50° C. and about −110° C. Preferably the temperature is between about −90° C. and −110° C. In this embodiment, the temperature of operation of crystallizer 42 is −105° C. The bottoms from fractionator 31, which is the fresh charge to crystallizer 42, consists of o-xylene, 20 volumes, p-xylene, 15 volumes, ethylbenzene, 10 volumes, and paraffins, 5 volumes.

A mixture of crystals of o-xylene and p-xylene is withdrawn from the bottom of crystallizer 42 by way of line 43 and is passed to centrifuge 44 wherein mother liquor is separated from the crystals. Other methods of separating mother liquor and crystals may be utilized.

Mother liquor is withdrawn from centrifuge 44 and is passed by way of line 46 into heat exchanger 39 where it prechills the charge to crystallizer 42. In order to maintain the slurry in crystallizer 42 at between about 20 and 40% of the contents, a portion of the mother liquor from line 46 is recycled by way of valved line 47 to line 41 and thence into crystallizer 42. In this embodiment, the slurry is maintained at 30% and 4 volumes of mother liquor are recycled per volume of fresh charge.

The mixture of crystals of o-xylene and p-xylene from centrifuge 44 is passed by way of line 51 through heat exchanger 52 and line 53 into crystallizer 54. In this embodiment, the crystals have been melted and the liquid is passed into crystallizer 54. However, it is possible to operate by a fractional melting technique to achieve about the same result. Crystalizer 54 is a conventional crystallizer and is operated at a temperature about that of the freezing point of the eutectic mixture of o-xylene and p-xylene, i. e., about −35° C. Since operation exactly at this point is impractical, crystallizer 54 is normally operated at between about −30° C. and −35° C. In this embodiment, the temperature of crystallizer 54 is −33° C. The crystals from centrifuge 44 have a composition, in this embodiment, of p-xylene, 20.4 parts, and o-xylene, 19.9 parts.

The slurry from crystallizer 54 is passed by way of line 56 into centrifuge 57. Essentially pure p-xylene crystals are withdrawn from centrifuge 57 by way of line 58 and passed to storage not shown. In this embodiment, the total yield of p-xylene is 14.4 parts or 96% of the theoretical based on p-xylene charged to extractor 13.

A second mother liquor is obtained from centrifuge 57 and is passed by way of line 61, heat exchanger 62 and line 63 into fractionator 64. This mother liquor has a composition about that of the eutectic mixture of p-xylene and o-xylene. In order to maintain a slurry amounting to between about 20 and 40% in crystallizer 54, a portion of the second mother liquor is recycled by way of valved line 66 to crystallizer 54. In this embodiment, about 1 volume of second mother liquor is recycled per 5 volumes of material from line 53 and line 67 charged to crystallizer 54.

Fractionator 64 is a conventional fractional distillation column provided with internal reboiler 69. The number of theoretical plates and operating conditions of fractionator 64 is dependent upon the purity desired of the o-xylene product fraction. In this embodiment, fractionator 64 contains about 50 theoretical plates and is operated with a top reflux of about 8 volumes per volume of overhead product. Under these conditions, the o-xylene withdrawn as a bottoms product by way of line 71 is essentially pure, i. e., 99+%. The o-xylene product is passed to storage by lines not shown. In this embodiment, the o-xylene yield is 17.9 parts or 89.5% of the theoretical recovery of the o-xylene present in the feed to extractor 13.

The overhead product from tower 64 consists of a mixture of p-xylene and o-xylene. This mixture consists of p-xylene, 6 parts, and o-xylene, 2 parts. This overhead fraction is withdrawn from fractionator 64 by way of line 72 and is passed through heat exchanger 73 and then may be recycled by way of valved line 67 to crystallizer 54. Or this stream may be passed by way of valved line 68 to crystallizer 42, when materials other than o-xylene and p-xylene build up in this stream. When a p-xylene concentrate containing about 75% p-xylene is suitable, this stream may be withdrawn from the system and sent to storage not shown for eventual sale or use as a relatively high purity p-xylene fraction.

After leaving heat exchanger 39, the mother liquor from line 46 is passed by way of line 81 into mixer 82. This mother liquor has the composition, o-xylene, 2.1 volumes, p-xylene, 0.6 volume, ethylbenzene, 15 volumes, and paraffins, 5 volumes. Liquid HF from source 19a and $BF_3$ from source 21a are passed by way of lines 83 and 84 respectively into line 86. From line 86 these are introduced into mixer 82.

Mixer 82 may be any form of conventional mixing apparatus or may be a line mixing arrangement whereby the HF—$BF_3$ and aromatic hydrocarbons in the mother liquor may complex. Herein sufficient HF is introduced so that about 11 moles of liquid HF are present per mole of polyalkylbenzene present in the subsequent reaction zone. Sufficient $BF_3$ is introduced so that about 1 mole of $BF_3$ is present per mole of polyalkylbenzene in the subsequent reaction zone.

From mixer 82, the HF—$BF_3$-mother liquor acid phase is passed by way of line 88 into line 89 where it meets the acid phase leaving extractor 13. The contents of line 89 are introduced into reactor 91. Reactor 91 is a vessel provided with motor driven agitator 92 and heat exchanger means 93 and 94. In reactor 91 the materials are contacted at a temperature and time relationship such that essentially all the ethylbenzenes interact with xylene to form 1,3-dimethyl-5-ethylbenzene and the o-xylene and p-xylene isomerize to m-xylene. In general, the temperature in reactor 91 is maintained between about +10° C. and +175° C. Preferably the temperature is between about 30° C. and about 75° C. and the time of contacting is between about 15 minutes and about 6 hours wherein the longer times correspond to the lower temperatures. In this embodiment the temperature in reactor 91 is 75° C. and the time is 15 minutes.

Material is withdrawn from reactor 91 at an upper point by way of line 96 where it meets a stream of pentane from source 97 and line 98. The pentane and acid phase are passed into mixer 101 where they are intermingled. The purpose of the pentane is to strip completely from the acid phase the close boiling non-aromatic hydrocarbons and permit the recovery of the essentially pure m-xylene. About 2 volumes of pentane are used per volume of paraffinic hydrocarbons in the acid phase. The material from mixer 101 is passed by way of line 102 into settler 103.

Settler 103 is a simple gravity settler wherein the raffinate phase comprising xylene boiling range paraffins and pentane settle as an upper layer and are withdrawn by way of line 104. The hydrocarbons from line 104 are passed into fractionator 106 which is provided with reboiler 107. There is shown schematically the removal of HF and $BF_3$ overhead by way of line 109. These are recycled for reuse in the process by way of lines not shown. A pentane fraction is withdrawn by way of line 111 and a benzene fraction is withdrawn by way of line 112; the pentane fraction is recycled for reuse in the process by lines not shown. The benzene is passed to storage by lines not shown. Xylene boiling range paraffins are withdrawn as a bottoms product and are sent to storage by way of line 114 and other lines not shown.

A lower layer of acid phase is withdrawn from settler 103 by way of line 117 and is passed through heat exchanger 118 and thence by way of line 119 into decomposer 121. Decomposer 121 is provided with internal heat exchanger 122. Decomposer 121 is a vessel adapted for quickly removing HF and $BF_3$ from the acid phase. The HF and $BF_3$ must be removed under conditions of time and temperature such that no disproportionation of the m-xylene to trimethylbenzenes occurs. A suitable temperature is 50° C. HF and $BF_3$ are taken overhead by way of line 124 and are recycled for reuse in the process. A pentane fraction is shown as being removed overhead by way of line 126 and is recycled for reuse in the process.

The reaction product mixture produced in reactor 91 is recovered as a bottoms fraction from decomposer 121. This reaction product mixture consists of benzene, m-xylene, 1,3,5-ethylxylene (1,3-dimethyl-5-ethylbenzene) and a slight amount of $C_9$ aromatic hydrocarbons present in the feed. The reaction product mixture is removed from decomposer 121 by way of line 129 and is passed into fractionator 131; a reboiler 132 is provided in fractionator 131. There is shown schematically as being withdrawn from fractionator 131 a benzene fraction by way of line 136, an m-xylene fraction by way of line 137, a $C_9$ fraction by way of line 138, and a 1,3,5-ethylxylene fraction by way of line 139. The m-xylene fraction consists of 12.7 parts or 36% theoretical yield based on m-xylene in the feed. The 1,3-dimethyl-5-ethylbenzene fraction consists of 25 parts or a yield of approximately 100% based on ethylbenzene present in the feed. The sum total of benzene produced is 25 parts or 1 mole for each mole of ethylbenzene converted.

Thus, in the embodiment, all of the ethylbenzene present in the feed is recovered in a form having a value as great, if not somewhat greater than the ethylbenzene itself, i. e., the 1,3-dimethyl-5-ethyl-benzene. Essentially pure o-xylene is recovered at a yield of about 90% of the theoretical. The very valuable p-xylene is recovered at a yield of 96% of the theoretical. On the other hand, the yield of m-xylene is much lower than the theoretical; the lost m-xylene is replaced by benzene which presently is worth much more than m-xylene. Thus, by the process of this invention, it is possible to separate a $C_8$ aromatic fraction into the components which are most valuable and simultaneously to diminish the recovery of the m-xylene which is the least valuable component.

In the description of the embodiment as given above an attempt was made to maximize the recovery of the o-xylene and the p-xylene. It is to be understood that the process is quite flexible and the yield of m-xylene can be increased by suitable adjustment of the operations in extractor 13 and crystallizers 42 and 54 to reject more o-xylene and p-xylene to reactor 91.

Conversely, should the demand for 1,3-dimethyl-5-ethylbenzene increase beyond that obtainable from the feed from source 11, additional m-xylene may be converted to the desired 1,3-dimethyl-5-ethylbenzene by introducing ethylene from source 142 by way of valved line 143 (shown dotted) into reactor 91. Under these conditions the alkylation proceeds to the desired product.

Thus having described the invention, what is claimed is:

1. A process which comprises (1) contacting, under substantially anhydrous conditions (a) a feed containing o-xylene, m-xylene, p-xylene and ethylbenzene as essentially the only aromatic hydrocarbon constituents and essentially no hydrocarbons reactive therewith, with (b) an HF–BF$_3$ treating agent consisting essentially of about 1 mole of BF$_3$ per mole of m-xylene plus not more than 0.5 mole of BF$_3$ per mole of ethylbenzene and between about 5 and 50 moles of liquid HF per mole of m-xylene, at (c) a temperature between about $-10°$ C. and $+30°$ C. for a time between about 2 minutes and 30 minutes to essentially avoid isomerization of o-xylene and p-xylene, (2) separating a raffinate phase comprising benzene, o-xylene, p-xylene, ethylbenzene, and non-aromatic hydrocarbons from an extract phase comprising HF, BF$_3$, m-xylene, C$_{10}$ aromatic hydrocarbons and substantially no o-xylene and p-xylene, (3) removing HF and BF$_3$ from said raffinate phase to obtain a raffinate, (4) chilling said raffinate to a temperature between about $-50°$ C. and about $-110°$ C. to produce a mixture of crystals of p-xylene and o-xylene, (5) separating said crystals from mother liquor, (6) recrystallizing said crystals to obtain crystals of essentially pure p-xylene and a second mother liquor consisting essentially of about the eutectic mixture of o-xylene and p-xylene, (7) separating said p-xylene crystals from said second mother liquor, (8) distilling said second mother liquor to obtain an essentially pure o-xylene fraction and a fraction consisting essentially of o-xylene and p-xylene, (9) contacting, under substantially anhydrous conditions, (a) the extract phase of step (2) together with mother liquor from step (5), in the presence of (b) BF$_3$ in an amount of at least about 1 mole and (c) liquid HF in an amount between about 5 and 50 moles, respectively, per mole of polyalkylbenzene present in said contacting zone at (d) a temperature between about $+30°$ C. and $+75°$ C. for a time between about 15 minutes and about 6 hours, the longer times corresponding to the lower temperatures to convert essentially all the ethylbenzenes to 1,3-dimethyl-5-ethylbenzene and all the o-xylene and p-xylene to m-xylene, (10) removing HF and BF$_3$ from the reaction product mixture produced in step (9), and (11) distilling said mixture to obtain an essentially pure 1,3-dimethyl-5-ethylbenzene fraction and a xylene boiling range fraction containing essentially only m-xylene as the aromatic hydrocarbon component.

2. The process of claim 1 wherein the fraction consisting essentially of o-xylene and p-xylene of step (8) is cycled to the recrystallization zone of step (5).

3. The process of claim 1 wherein the product containing effluent from the contacting zone of step (9) is washed with a low boiling hydrocarbon to remove from the acid phase the non-aromatic hydrocarbons which boil in the xylene range and a non-aromatic hydrocarbon-wash hydrocarbon phase is separated from an acid phase essentially free of non-aromatic hydrocarbons which boil in the xylene range.

4. A process which comprises (A) contacting in a flow system, under substantially anhydrous conditions, (a) a xylene boiling range petroleum distillate containing o-xylene, m-xylene, p-xylene and ethylbenzene as essentially the only aromatic hydrocarbon constituents and essentially no hydrocarbons reactive therewith, with (b) an HF—BF$_3$ treating agent consisting essentially of about 1 mole of BF$_3$ per mole of m-xylene plus about 0.5 mole of BF$_3$ per mole of ethylbenzene and between about 7 and 15 moles of liquid HF per mole of m-xylene, at (c) a temperature between about $+10°$ C. and $+25°$ C. for a time of not more than about 20 minutes, in the presence of an m-xylene reflux stream, (B) separating a raffinate phase comprising benzene, o-xylene, p-xylene, ethylbenzene, and non-aromatic hydrocarbons from an extract phase comprising HF, BF$_3$, m-xylene, C$_{10}$ aromatic hydrocarbons and essentially no o-xylene and p-xylene, (C) removing HF and BF$_3$ from said raffinate phase to obtain a raffinate, (D) chilling said raffinate to a temperature between about $-90°$ C. and $-110°$ C. to produce a mixture of crystals of p-xylene and o-xylene, (E) separating said crystals from mother liquor, (F) recrystallizing said crystals at a temperature between about $-30°$ C. and $-35°$ C. to obtain crystals of essentially pure p-xylene and a second mother liquor consisting of about the eutectic mixture of o-xylene and p-xylene, (G) separating the p-xylene crystals of step (F) from said second mother liquor, (H) distilling said second mother liquor to obtain an essentially pure o-xylene fraction and a fraction consisting essentially of o-xylene and p-xylene, (I) recycling mixed xylene fraction of step (H) to crystallization step F, (J) contacting, under substantially anhydrous conditions, (a) the extract phase of step (B) together with mother liquor from step (E), in the presence of (b) BF$_3$ in an amount of at least 1 mole and (c) liquid HF in an amount between about 7 and 15 moles, respectively, per mole of polyalkylbenzene present in said contacting zone at (d) a temperature between about $+30°$ C. and $+75°$ C. for a time between about 15 minutes and about 6 hours, the longer time corresponding to the lower temperatures, whereby essentially all the ethylbenzenes are converted to 1,3-dimethyl-5-ethylbenzene and the xylenes to m-xylene, (K) washing the acid phase system of step (J) with a low boiling hydrocarbon to obtain a separate phase comprising hydrocarbons and non-aromatics boiling in the xylene range, (L) separating the phases of step (K) to obtain an acid phase containing low boiling hydrocarbons as essentially the only non-aromatic hydrocarbons, (M) removing HF and BF$_3$ from the acid phase of step (L) and (N) distilling the reaction product mixture to obtain essentially pure 1,3-dimethyl-5-ethylbenzene and m-xylene.

References Cited in the file of this patent
UNITED STATES PATENTS

| | | |
|---|---|---|
| 2,398,526 | Greenburg | Apr. 16, 1946 |
| 2,511,711 | Hetzner et al. | June 13, 1950 |
| 2,562,068 | Souders | July 24, 1951 |
| 2,564,073 | Lien et al. | Aug. 14, 1951 |
| 2,661,382 | Lien et al. | Dec. 1, 1953 |
| 2,667,446 | Findlay | Jan. 26, 1954 |
| 2,683,760 | McCaulay et al. | July 13, 1954 |
| 2,753,386 | McCaulay et al. | July 3, 1956 |